United States Patent
Tankov et al.

(10) Patent No.: US 7,962,612 B2
(45) Date of Patent: Jun. 14, 2011

(54) METHOD FOR CONNECTION LEAK DETECTION AND PREVENTION

(75) Inventors: Nikolai Tankov, Sofia (BG); Peter Matov, Volingrad (BG)

(73) Assignee: SAP AG, Walldorf (DE)

( * ) Notice: Subject to any disclaimer, the term of this patent is extended or adjusted under 35 U.S.C. 154(b) by 457 days.

(21) Appl. No.: 12/113,025

(22) Filed: Apr. 30, 2008

(65) Prior Publication Data

US 2008/0270600 A1 Oct. 30, 2008

Related U.S. Application Data

(60) Provisional application No. 60/926,989, filed on Apr. 30, 2007.

(51) Int. Cl.
*G06F 13/00* (2006.01)

(52) U.S. Cl. .................. 709/224; 709/226; 709/229

(58) Field of Classification Search .................. 709/217, 709/219, 223, 224, 226, 227, 229
See application file for complete search history.

(56) References Cited

U.S. PATENT DOCUMENTS

| | | | | |
|---|---|---|---|---|
| 7,698,434 B2 * | 4/2010 | June et al. | ..................... | 709/227 |
| 2005/0009467 A1 * | 1/2005 | Nuber | .......................... | 455/12.1 |

\* cited by examiner

*Primary Examiner* — Viet Vu

(57) ABSTRACT

A method, system and machine readable medium for connection leak detection and prevention collect metadata about the connection on a request by an enterprise component and on connection release or transaction completion. If the enterprise component is server managed, the connection gets automatically released by the server at the end of the call to the enterprise component. If the enterprise component is not server managed, the collected metadata is stored and displayed in a user readable manner allowing an administrator to identify the erroneous behaving enterprise component which is causing the connection leak.

14 Claims, 6 Drawing Sheets

Connection ID:

*Allocated* - <metadata about an enterprise component allocated the connection>

*Closed* (not available if the enterprise component did not perform close)

*Involved in transaction:* (not available if the connection was not enlisted in a transaction)

*Started* - <metadata about an enterprise component started the transaction>

*Committed* (not available if the enterprise component did not perform commit)

*Rolled Back* (not available if the enterprise component did not perform rollback)

Figure 6

METHOD FOR CONNECTION LEAK DETECTION AND PREVENTION

This application is related to U.S. Provisional Patent Application Ser. No. 60/926,989, entitled "Web Container et al.", filed Apr. 30, 2007, from which priority is claimed, and which is hereby incorporated by reference.

FIELD OF INVENTION

The field of invention relates generally to software, and in particular but not exclusively relates to pooled connection leak detection and prevention techniques.

BACKGROUND

Connection pooling is a well known technique in software engineering which allows reusing of expensive connection objects. In an enterprise environment, a connection to a back-end system such as database or enterprise information system is an example of an expensive connection object. Pooling and reusing these expensive connections leads to better scalability and performance of the enterprise environment.

One of the most common issues regarding connection pooling is the possibility of connection leaks. A connection leak occurs if an enterprise component misuses an acquired connection. For example, if the connection is not closed at the end of a call to the enterprise component or if there is an ongoing transaction which is not completed at the end of the call, the connection will not be released by the enterprise component and will not be returned to the pool. After a certain amount of calls the pool will be exhausted and each subsequent call to an enterprise component which requires a connection will fail.

The standard way of dealing with connection leaks requires numerous attempts to reproduce the problem and analyzing all connection leaks generated in the enterprise environment log files in order to identify the enterprise component causing the connection leak. Such an approach is time consuming and sometimes the generated information could be misinterpreted. Therefore, a more efficient approach is needed, providing human readable metadata about the status of a connection object and the enterprise component acquired the connection.

SUMMARY

A method, system and machine readable medium for connection leak detection and prevention are described for collecting metadata about the connection on a request by an enterprise component and on connection release or transaction completion. If the enterprise component is server managed, the connection gets automatically released by the server at the end of the call to the enterprise component. If the enterprise component is not server managed, the collected metadata is stored and displayed in a user readable manner allowing an administrator to identify the erroneously behaving enterprise component which is causing the connection leak.

BRIEF DESCRIPTION OF THE DRAWINGS

A better understanding of the present invention can be obtained from the following detailed description in conjunction with the following drawings, in which:

FIG. 6 is an example of user readable metadata displayed in the case of a connection leak, in accordance with an embodiment of the present invention.

DETAILED DESCRIPTION

Embodiments of a method, system and machine readable medium for connection leak detection and prevention are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
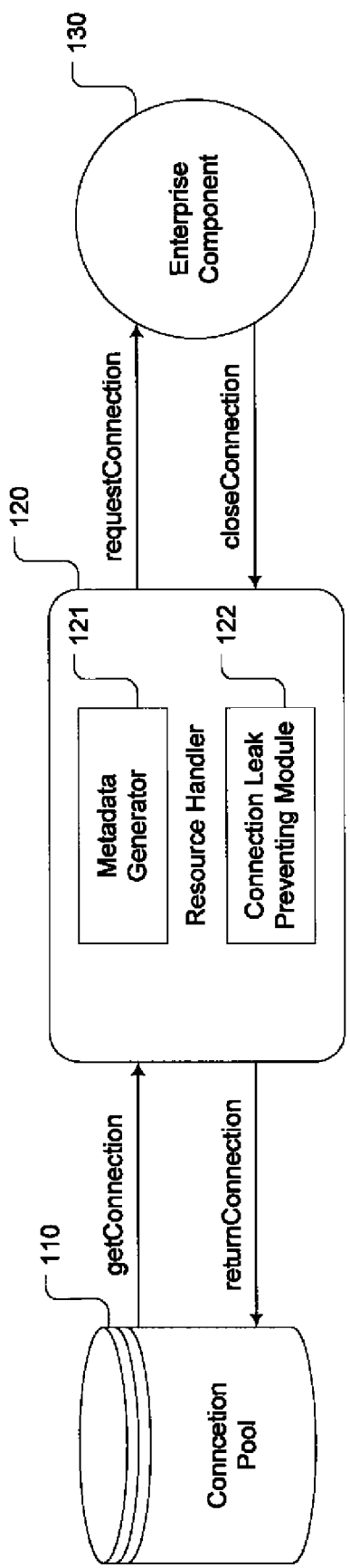
FIG. 1 is a block diagram of a system for connection leak detection and prevention in an enterprise environment, in accordance with an embodiment of the present invention.

FIG. 1 is a block diagram of a system for connection leak detection and prevention in an enterprise environment. The Enterprise Component 130 requests a connection from the Resource Handler 120. The Metadata Generator 121 records the connection request and the Resource Handler 120 requests a connection object from Connection Pool 110. If there is a connection available in Connection Pool 110 at the time of the request, the Resource handler 120 acquires and returns the connection to the Enterprise Component 130. If the Enterprise Component 130 closes the connection, the Metadata Generator 121 records the close operation and the Resource Handler 120 cleans up and returns the connection to Connection Pool 110. The Connection Leak Preventing Module 122 tracks all connections acquired by the Enterprise Component 130.

If the logic of the Enterprise Component 130 is managed by the enterprise server, at the end of the call to the Enterprise Component 130, the Connection Leak Preventing Module 122 checks which connection objects have not been closed by the Enterprise Component 130 during the call, closes and returns these connections to the Connection Pool 110 automatically. In one embodiment of the present invention, the enterprise environment might be a Java Enterprise Edition (JEE) environment. In the JEE environment, examples of server managed enterprise components would be JavaServer Pages (JSP) and Servlets, Stateless Session, Entity and Message Driven Enterprise JavaBeans.

If the logic of the Enterprise Component 130 is not managed by the enterprise server, the Connection Leak Preventing Module 122 cannot determine whether the Enterprise Component 130 has finished working with the provided connection or not, thus if the Enterprise Component 130 does not close the connection object explicitly, a connection leak will occur. In case of a connection leak, the metadata recorded by the Metadata Generator 121 is displayed in a user readable manner allowing an administrator to identify the erroneous behaving enterprise component which is causing the connection leak. In one embodiment, the metadata is displayed as shown in FIG. 6 described below.

Figure 2:
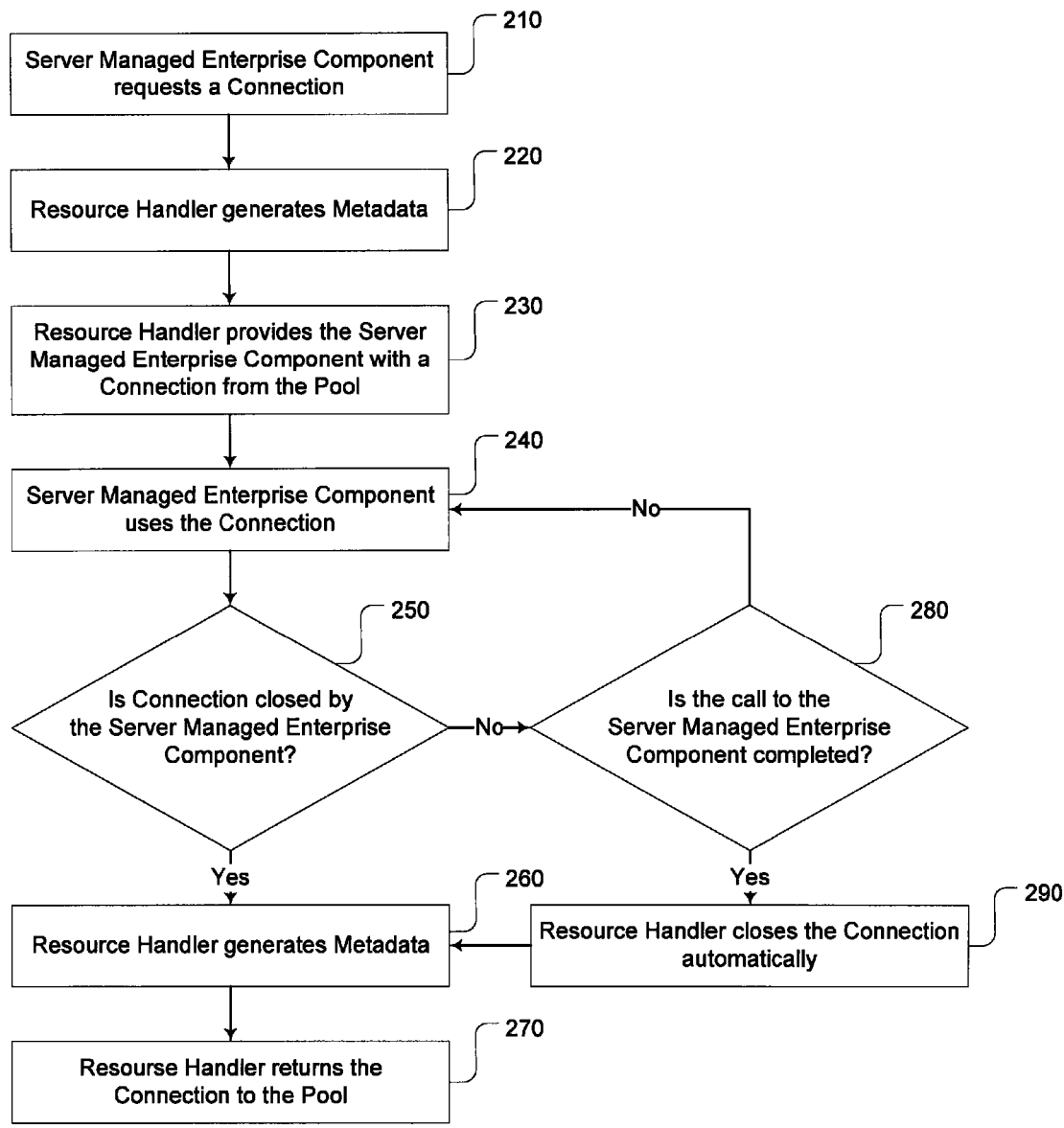
FIG. 2 is a flow diagram of a connection management process in the case of a server managed enterprise component that requests a connection, in accordance with an embodiment of the present invention.

FIG. 2 is a flow diagram of a connection management process in the case of a server managed Enterprise Component that requests a connection. At block 210 the server managed Enterprise Component requests a connection. The Resource Handler generates metadata regarding the connection request at block 220. If there is an available connection in the Connection Pool, the Resource Handler provides the connection to the server managed Enterprise Component at block 230 and the server managed Enterprise Component performs some operations with the connection at block 240. If the connection is closed by the server managed Enterprise Component at block 250, a notification is sent to the Resource Handler. On connection close, the Resource Handler generates metadata at block 260 and returns the cleaned up connection object in the Connection Pool at block 270. If the call to the server managed Enterprise Component is completed at block 280, a notification is sent to the Resource Handler. If there are any connections still in use when the call to the server managed Enterprise Component is completed, the Resource Handler closes them automatically at block 290, thus preventing a connection leak.

Figure 3:
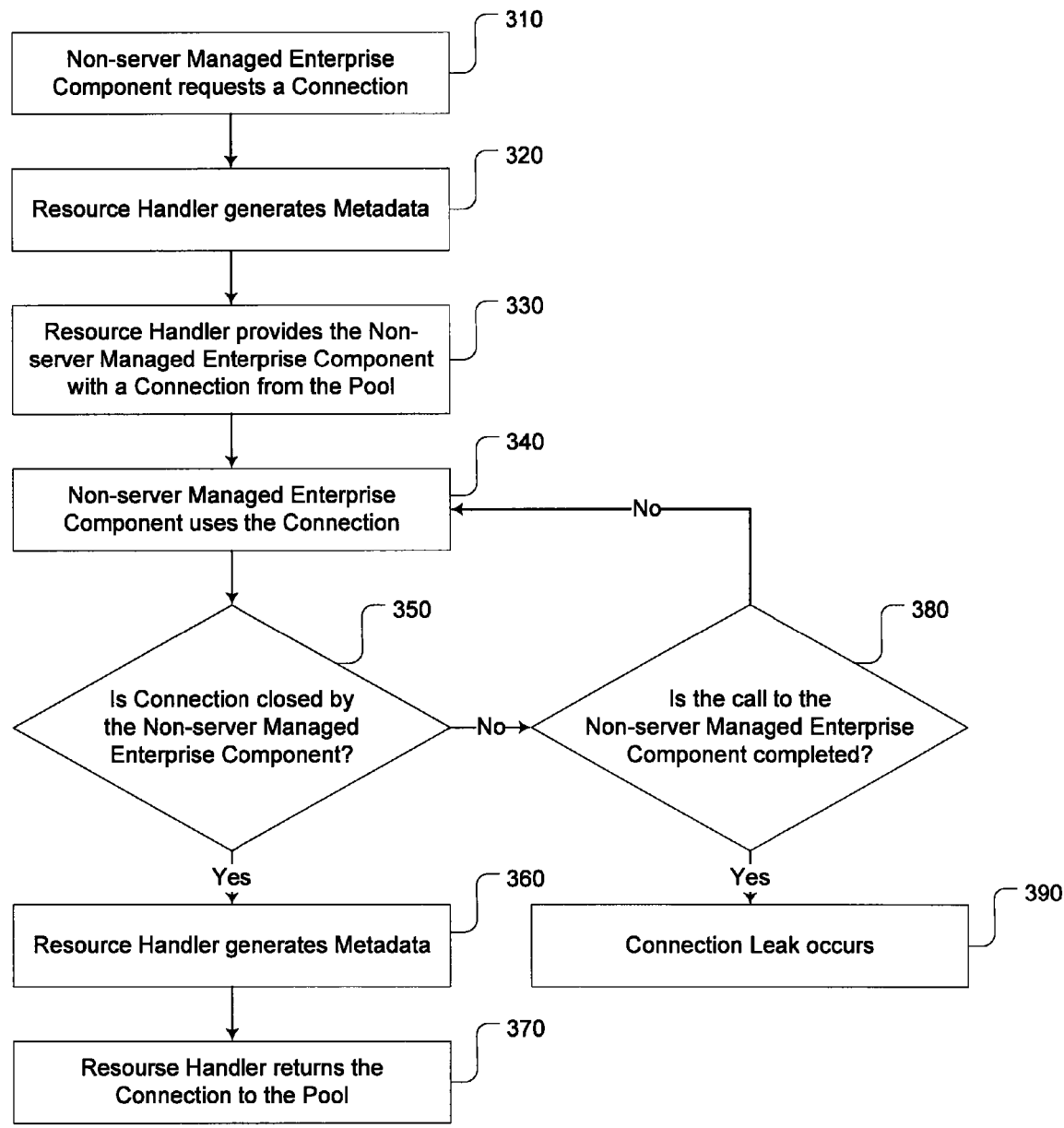
FIG. 3 is a flow diagram of a connection management process in the case of a non-server managed enterprise component that requests a connection, in accordance with an embodiment of the present invention.

FIG. 3 is a flow diagram of a connection management process in the case of a non-server managed Enterprise Component that requests a connection. At block 310 the non-server managed Enterprise Component requests a connection. The Resource Handler generates metadata regarding the connection request at block 320. If there is an available connection in the Connection Pool, the Resource Handler provides the connection to the non-server managed Enterprise Component at block 330 and the non-server managed Enterprise Component performs some operations with the connection at block 340. If the connection is closed by the non-server managed Enterprise Component at block 350, a notification is sent to the Resource Handler. On connection close, the Resource Handler generates metadata at block 360 and returns the cleaned up connection object in the Connection Pool at block 370. If the call to the non-server managed Enterprise Component is completed at block 380, the Resource Handler cannot be notified, since the logic of the Enterprise Component is not managed by the server. In the JEE environment, an example of a non-server managed enterprise component would be a Stateful Session Enterprise JavaBean. If there are any connections still in use when the call to the non-server managed Enterprise Component is completed, a connection leak will occur at block 390. Although this embodiment of the invention does not prevent the connection leak, the metadata generated at block 320 can be displayed in a user readable manner allowing an administrator to identify the erroneous behaving enterprise component which is causing the connection leak. In one embodiment, the metadata is displayed as shown in FIG. 6 described below.

Figure 4:
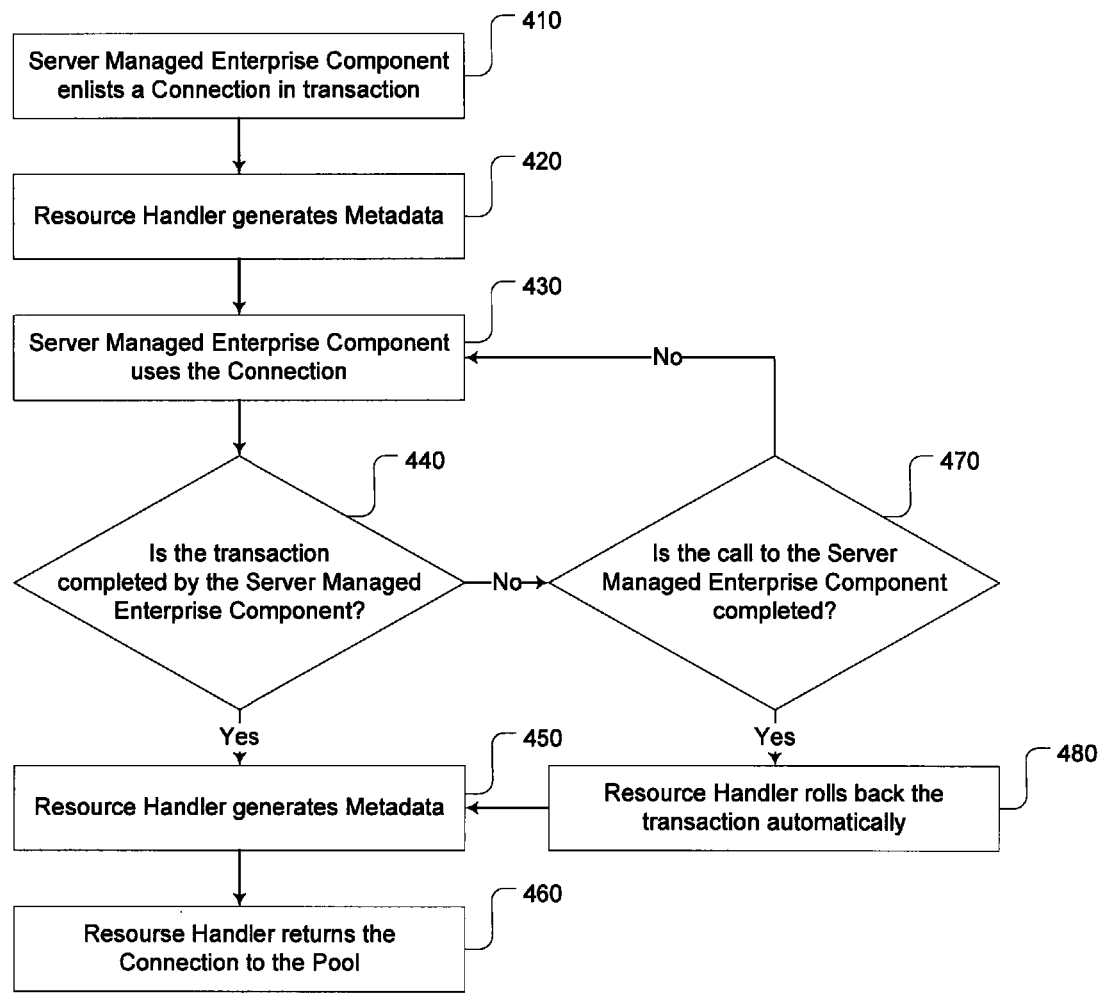
FIG. 4 is a flow diagram of a transaction management process in the case of a server managed enterprise component that enlists a connection in a transaction, in accordance with an embodiment of the present invention.

FIG. 4 is a flow diagram of a transaction management process in the case of a server managed Enterprise Component that enlists a connection in a transaction. Once a server managed Enterprise Component starts using a connection at block 240 of FIG. 2, the server managed Enterprise Component is capable of enlisting the connection in a transaction at block 410. At block 420, the Resource Handler generates metadata regarding the transaction in which the connection object has been enlisted and the server managed Enterprise Component responsible for the enlist operation. The server managed Enterprise Component performs some transactional operations with the connection at block 430. If the transaction is completed by the server managed Enterprise Component at block 440, the Resource Handler receives a notification, generates metadata regarding the transaction completion at block 450 and returns the connection to the Connection Pool at block 460. If the call to the server managed Enterprise Component is completed at block 470, a notification is sent to the Resource Handler. If there is still an ongoing transaction which was not completed by the server managed Enterprise Component, the Resource Handler rolls back the transaction automatically at block 480, thus releasing automatically all connections involved in the rolled back transaction.

Figure 5:
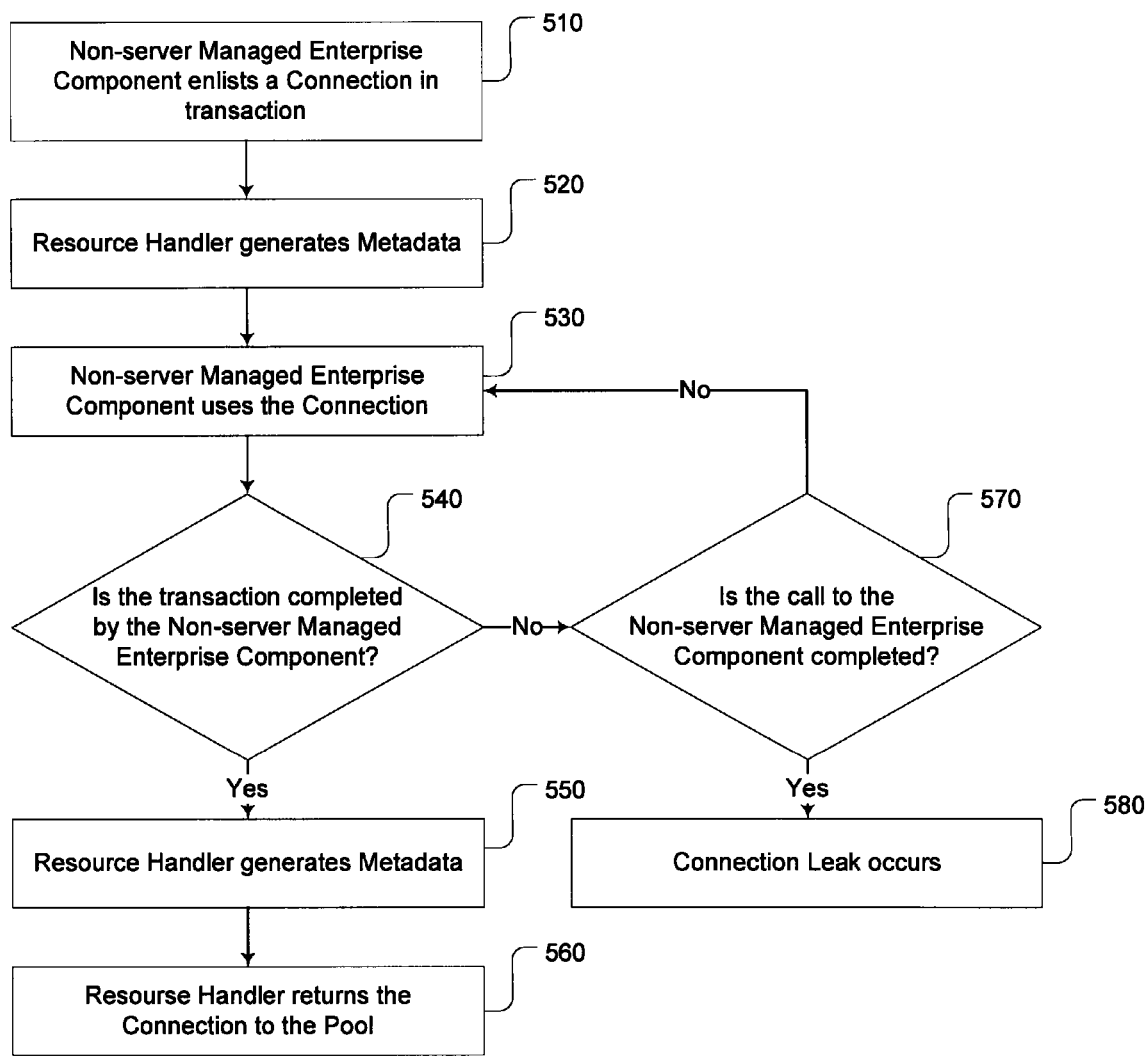
FIG. 5 is a flow diagram of a transaction management process in the case of a non-server managed enterprise component that enlists a connection in a transaction, in accordance with an embodiment of the present invention.

FIG. 5 is a flow diagram of a transaction management process in the case of a non-server managed Enterprise Component that enlists a connection in a transaction. Once a non-server managed Enterprise Component starts using a connection at block 340 of FIG. 3, the non-server managed Enterprise Component is capable of enlisting the connection in a transaction at block 510. At block 520, the Resource Handler generates metadata regarding the transaction in which the connection object has been enlisted and the non-server managed Enterprise Component responsible for the enlist operation. The non-server managed Enterprise Component performs some transactional operations with the connection at block 530. If the transaction is completed by the non-server managed Enterprise Component at block 540, the Resource Handler receives a notification, generates metadata regarding the transaction completion at block 550 and returns the connection to the Connection Pool at block 560. If the call to the non-server managed Enterprise Component is completed at block 570 and the transaction has not been completed by the non-server managed Enterprise Component, the Resource Handler cannot be notified, since the logic of the Enterprise Component is not managed by the server. If there is an ongoing transaction when the call to the non-server managed Enterprise Component is completed, a connection leak will occur at block 590. Although this embodiment does not prevent the connection leak in case the transaction is not completed by the non-server managed Enterprise Component, the metadata generated at block 520 can be displayed along with the metadata generated at block 320 of FIG. 3 in a user readable manner allowing an administrator to identify the erroneous behaving enterprise component which is causing the connection leak. In one embodiment, the metadata is displayed as shown in FIG. 6 described below.

FIG. 6 is an example of user readable metadata displayed in case of a connection leak. In one embodiment of the present invention, the user readable metadata displayed in case of a connection leak may comprise a connection identifier for the leaked connection. The metadata comprises information about the Enterprise Component allocated the connection. In the JEE environment, a Java stack trace may be used in order to trace the call to the code line where the connection has been requested from the Resource Handler. The metadata comprises information if the Enterprise Component has performed a close operation on the leaked connection. If the connection has been enlisted in a transaction by the Enterprise Component, the metadata comprises information when the Enterprise Component has started the transaction and if the transaction was completed. In the JEE environment, a Java stack trace may be used in order to trace the call to the code line where the transaction has been started, committed or rolled back.

In one embodiment of the present invention the metadata shown in FIG. 6 may be displayed in a user interface or a shell console on demand. In another embodiment, the metadata may be saved in log files during the runtime of the enterprise environment.

The above description of illustrated embodiments of the invention, including what is described in the Abstract, is not intended to be exhaustive or to limit the invention to the precise forms disclosed. While specific embodiments of, and examples for the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method for connection object leak detection and prevention executing on a processor, the method comprising:
   generating metadata regarding a lifecycle of a pooled connection object within an enterprise server environment;
   preventing, based on the metadata, a connection object leak caused by a server managed enterprise component misusing the pooled connection object; and
   providing information, based on the metadata, about a connection object leak caused by a non-server managed enterprise component misusing the pooled connection object.

2. The method of claim 1, wherein generating metadata comprises:
   gathering information when the pooled connection object is acquired by an enterprise component;
   gathering information when the pooled connection object is released by the enterprise component; and
   gathering information when the pooled connection object is involved in a transaction.

3. The method of claim 2, wherein gathering information when the pooled connection object is involved in a transaction comprises:
   identifying an enterprise component which has enlisted the pooled connection object in the transaction; and
   identifying whether the transaction was committed or rolled back by the enterprise component.

4. The method of claim 1, wherein preventing the connection object leak comprises:
   tracking all pooled connection objects involved in a call to the server managed enterprise component; and
   releasing automatically the pooled connection objects which remain occupied by the server managed enterprise component after the call is completed.

5. The method of claim 1, wherein providing information about the connection object leak comprises displaying user readable metadata about all currently used pooled connection objects maintained by a connection object pool.

6. In an enterprise server environment, a computer system for connection object leak detection and prevention including at least one processor and memory for executing program code, the code comprising:
   an enterprise component to acquire a pooled connection object;
   a connection object pool to provide the pooled connection object to the enterprise component; and
   a resource handler to manage the pooled connection object in the enterprise server environment.

7. The system of claim 6, wherein the resource handler comprises:
   a metadata generator to generate metadata regarding the lifecycle of the pooled connection object within the enterprise server environment; and
   a connection leak preventing module to prevent a connection leak, if the enterprise component is server managed.

8. The system of claim 6, wherein the resource handler displays user readable metadata about all currently used pooled connection objects maintained by a connection object pool.

9. A non-transitory machine readable medium having a set of instruction stored therein, which when executed cause a machine to perform a set of operations comprising:
   generating metadata regarding a lifecycle of a pooled connection object within an enterprise server environment;
   preventing, based on the metadata, a connection object leak caused by a server managed enterprise component misusing the pooled connection object; and
   providing information, based on the metadata, about a connection object leak caused by a non-server managed enterprise component misusing the pooled connection object.

10. The machine readable medium from claim 9, having a set of instructions stored therein which when executed cause a machine to perform a set of operations wherein generating metadata comprises:
    gathering information when the pooled connection object is acquired by an enterprise component;
    gathering information when the pooled connection object is released by the enterprise component; and
    gathering information when the pooled connection object is involved in a transaction.

11. The machine readable medium from claim 10, having a set of instructions stored therein which when executed cause a machine to perform a set of operations wherein gathering information when the pooled connection object is involved in a transaction comprises:
    identifying an enterprise component which has enlisted the pooled connection object in the transaction; and
    identifying whether the transaction was committed or rolled back by the enterprise component.

12. The machine readable medium from claim 9, having a set of instructions stored therein which when executed cause a machine to perform a set of operations wherein preventing the connection object leak comprises:
    tracking all pooled connection objects involved in a call to the server managed enterprise component; and
    releasing automatically the pooled connection objects which remain occupied by the server managed enterprise component after the call is completed.

13. The machine readable medium from claim 9, having a set of instructions stored therein which when executed cause a machine to perform a set of operations wherein providing information about the connection object leak comprises displaying user readable metadata about all currently used pooled connection objects maintained by a connection object pool.

14. The method of claim 1, wherein the metadata is human readable metadata about the status of a connection object and the enterprise component acquiring the connection.

* * * * *